United States Patent
Green et al.

(10) Patent No.: US 7,665,761 B1
(45) Date of Patent: Feb. 23, 2010

(54) INFLATABLE PERSONAL RESTRAINT SYSTEMS AND ASSOCIATED METHODS OF USE AND MANUFACTURE

(75) Inventors: Thomas J. Green, Phoenix, AZ (US); Kevin Keeslar, Chandler, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 12/057,295

(22) Filed: Mar. 27, 2008

(51) Int. Cl.
*B60R 21/18* (2006.01)

(52) U.S. Cl. .................. 280/733; 280/730.1; 280/730.2

(58) Field of Classification Search ................. 280/729, 280/730.1, 730.2, 733
See application file for complete search history.

(56) References Cited

U.S. PATENT DOCUMENTS

| | | | |
|---|---|---|---|
| 3,430,979 A | 3/1969 | Terry et al. | |
| 3,682,498 A | 8/1972 | Rutzki et al. | |
| 3,706,463 A | 12/1972 | Lipkin | |
| 3,730,583 A | 5/1973 | Colovas et al. | |
| 3,756,620 A | 9/1973 | Radke | |
| 3,801,156 A | 4/1974 | Granig et al. | |
| 3,841,654 A | 10/1974 | Lewis | |
| 3,865,398 A * | 2/1975 | Woll ........................... | 280/733 |
| 3,866,940 A | 2/1975 | Lewis | |
| 3,888,503 A | 6/1975 | Hamilton | |
| 3,897,081 A | 7/1975 | Lewis | |
| 3,905,615 A | 9/1975 | Schulman | |
| 3,933,370 A | 1/1976 | Abe et al. | |
| 3,948,541 A | 4/1976 | Schulman | |
| 3,970,329 A | 7/1976 | Lewis | |
| 3,971,569 A | 7/1976 | Abe et al. | |
| 4,107,604 A | 8/1978 | Bernier | |
| 4,565,535 A | 1/1986 | Tassy | |
| 4,611,491 A | 9/1986 | Brown et al. | |
| 4,657,516 A | 4/1987 | Tassy | |
| 4,722,573 A | 2/1988 | Komohara et al. | |
| 4,765,569 A | 8/1988 | Higgins | |
| 4,842,299 A | 6/1989 | Okamura et al. | |
| 4,971,354 A | 11/1990 | Kim | |

(Continued)

FOREIGN PATENT DOCUMENTS

DE 4116162 11/1992

(Continued)

OTHER PUBLICATIONS

International Search Report and Written Opinion; International Patent Application No. PCT/US2008/059587; Filed Jul. 4, 2008; Applicant: AmSafe, Inc.; Mailed on Sep. 12, 2008.

(Continued)

*Primary Examiner*—Toan C To
(74) *Attorney, Agent, or Firm*—Perkins Coie LLP (57) ABSTRACT

Inflatable restraint systems for restraining an occupant in a vehicle are disclosed herein. A personal restraint system configured in accordance with one embodiment of the disclosure includes an airbag carried by a web. The web has an end portion operably coupled to the vehicle and is configured to extend around a portion of the occupant. The airbag includes a first inflatable chamber in fluid communication with a second inflatable chamber. The first inflatable chamber extends adjacent to a portion of the web when inflated, and the second inflatable chamber extends outwardly from the first inflatable chamber adjacent to a portion of the occupant when inflated.

26 Claims, 7 Drawing Sheets

U.S. PATENT DOCUMENTS

| | | | |
|---|---|---|---|
| 4,987,783 A | 1/1991 | D'Antonio et al. | |
| 4,995,638 A | 2/1991 | Shinto et al. | |
| 4,995,640 A | 2/1991 | Saito et al. | |
| 5,026,305 A | 6/1991 | Del Guidice et al. | |
| 5,062,662 A | 11/1991 | Cameron | |
| 5,062,663 A | 11/1991 | Satoh et al. | |
| 5,161,821 A | 11/1992 | Curtis | |
| 5,162,006 A | 11/1992 | Yandle, II | |
| 5,183,288 A | 2/1993 | Inada et al. | |
| 5,184,844 A | 2/1993 | Goor | |
| 5,194,755 A | 3/1993 | Rhee et al. | |
| 5,199,739 A | 4/1993 | Fujiwara et al. | |
| 5,288,104 A | 2/1994 | Chen et al. | |
| 5,299,827 A | 4/1994 | Igawa et al. | |
| 5,324,071 A | 6/1994 | Gotomyo et al. | |
| 5,335,937 A | 8/1994 | Uphues et al. | |
| 5,335,939 A | 8/1994 | Kuriyama et al. | |
| 5,375,875 A | 12/1994 | DiSalvo et al. | |
| 5,400,867 A | 3/1995 | Muller et al. | |
| 5,411,289 A | 5/1995 | Smith et al. | |
| 5,456,491 A | 10/1995 | Chen et al. | |
| 5,465,999 A | 11/1995 | Tanaka et al. | |
| 5,470,103 A | 11/1995 | Vaillancourt et al. | |
| 5,472,231 A | 12/1995 | France | |
| 5,473,111 A | 12/1995 | Hattori et al. | |
| 5,485,041 A | 1/1996 | Meister | |
| 5,492,360 A | 2/1996 | Logeman et al. | |
| 5,499,840 A | 3/1996 | Nakano et al. | |
| 5,597,178 A | 1/1997 | Hardin, Jr. | |
| 5,609,363 A | 3/1997 | Finelli | |
| 5,672,916 A | 9/1997 | Mattes et al. | |
| 5,734,318 A | 3/1998 | Nitschke et al. | |
| 5,752,714 A | 5/1998 | Pripps et al. | |
| 5,765,869 A | 6/1998 | Huber | |
| 5,772,238 A | 6/1998 | Breed et al. | |
| 5,803,489 A | 9/1998 | Nusshor et al. | |
| 5,839,753 A | 11/1998 | Yaniv et al. | |
| 5,851,055 A | 12/1998 | Lewis | |
| 5,863,065 A | 1/1999 | Boydston et al. | |
| 5,868,421 A | 2/1999 | Eyrainer et al. | |
| 5,871,230 A | 2/1999 | Lewis | |
| 5,886,373 A | 3/1999 | Hosogi et al. | |
| 5,906,391 A | 5/1999 | Weir et al. | |
| 5,924,726 A | 7/1999 | Pan et al. | |
| 5,927,748 A | 7/1999 | O'Driscoll | |
| 5,947,513 A * | 9/1999 | Lehto | 280/733 |
| 5,975,565 A | 11/1999 | Cuevas | |
| 5,984,350 A | 11/1999 | Hagan et al. | |
| 5,988,438 A | 11/1999 | Lewis et al. | |
| RE36,587 E | 2/2000 | Tanaka et al. | |
| 6,019,388 A | 2/2000 | Okazaki et al. | |
| 6,042,139 A | 3/2000 | Knox | |
| RE36,661 E | 4/2000 | Tanaka et al. | |
| 6,059,312 A | 5/2000 | Staub et al. | |
| 6,065,772 A | 5/2000 | Yamamoto et al. | |
| 6,082,763 A | 7/2000 | Kokeguchi et al. | |
| 6,113,132 A | 9/2000 | Saslecov et al. | |
| 6,126,194 A | 10/2000 | Yaniv et al. | |
| 6,135,489 A | 10/2000 | Bowers | |
| 6,142,508 A | 11/2000 | Lewis | |
| 6,142,511 A | 11/2000 | Lewis | |
| 6,155,598 A | 12/2000 | Kutchey | |
| 6,158,765 A | 12/2000 | Sinnhuber et al. | |
| 6,168,195 B1 | 1/2001 | Okazaki et al. | |
| 6,224,097 B1 | 5/2001 | Lewis | |
| 6,254,121 B1 | 7/2001 | Fowler et al. | |
| 6,293,582 B1 | 9/2001 | Lewis | |
| 6,336,657 B1 | 1/2002 | Akaba et al. | |
| 6,378,898 B1 | 4/2002 | Lewis et al. | |
| 6,382,666 B1 * | 5/2002 | Devonport | 280/733 |
| 6,390,502 B1 | 5/2002 | Ryan et al. | |
| 6,406,058 B1 | 6/2002 | Devonport et al. | |
| 6,419,263 B1 * | 7/2002 | Busgen et al. | 280/733 |
| 6,425,601 B1 | 7/2002 | Lewis | |
| 6,439,600 B1 | 8/2002 | Adkisson | |
| 6,460,878 B2 | 10/2002 | Eckert et al. | |
| 6,547,273 B2 * | 4/2003 | Grace et al. | 280/733 |
| 6,557,887 B2 | 5/2003 | Wohllebe et al. | |
| 6,585,289 B1 | 7/2003 | Hammer et al. | |
| 6,616,177 B2 | 9/2003 | Thomas et al. | |
| 6,648,367 B2 | 11/2003 | Breed et al. | |
| 6,688,642 B2 | 2/2004 | Sollars, Jr. | |
| 6,705,641 B2 | 3/2004 | Schneider et al. | |
| 6,739,264 B1 | 5/2004 | Hosey et al. | |
| 6,746,074 B1 | 6/2004 | Kempf et al. | |
| 6,749,220 B1 | 6/2004 | Wipasuramonton et al. | |
| 6,758,489 B2 | 7/2004 | Xu | |
| 6,764,097 B2 | 7/2004 | Kelley et al. | |
| 6,769,714 B2 | 8/2004 | Hosey et al. | |
| 6,776,434 B2 | 8/2004 | Ford et al. | |
| 6,779,813 B2 | 8/2004 | Lincoln et al. | |
| 6,789,818 B2 | 9/2004 | Gioutsos et al. | |
| 6,789,819 B1 | 9/2004 | Husby | |
| 6,789,821 B2 | 9/2004 | Zink et al. | |
| 6,793,243 B2 | 9/2004 | Husby | |
| 6,796,578 B2 | 9/2004 | White et al. | |
| 6,802,527 B2 | 10/2004 | Schmidt et al. | |
| 6,802,530 B2 | 10/2004 | Wipasuramonton et al. | |
| 6,808,198 B2 | 10/2004 | Schneider et al. | |
| 6,823,645 B2 | 11/2004 | Ford | |
| 6,824,163 B2 | 11/2004 | Sen et al. | |
| 6,825,654 B2 | 11/2004 | Pettypiece, Jr. et al. | |
| 6,830,263 B2 | 12/2004 | Xu et al. | |
| 6,830,265 B2 | 12/2004 | Ford | |
| 6,838,870 B2 | 1/2005 | Pettypiece, Jr. et al. | |
| 6,840,534 B2 | 1/2005 | Lincoln et al. | |
| 6,840,537 B2 | 1/2005 | Xu et al. | |
| 6,840,539 B2 | 1/2005 | Pettypiece, Jr. | |
| 6,843,503 B2 | 1/2005 | Ford | |
| 6,846,005 B2 | 1/2005 | Ford et al. | |
| 6,851,374 B1 | 2/2005 | Kelley et al. | |
| 6,857,657 B2 | 2/2005 | Canterberry et al. | |
| 6,860,509 B2 | 3/2005 | Xu et al. | |
| 6,863,301 B2 | 3/2005 | Ford et al. | |
| 6,869,101 B2 | 3/2005 | White et al. | |
| 6,871,872 B2 | 3/2005 | Thomas | |
| 6,871,874 B2 | 3/2005 | Husby et al. | |
| 6,874,814 B2 | 4/2005 | Hosey et al. | |
| 6,882,914 B2 | 4/2005 | Gioutsos et al. | |
| 6,886,856 B2 | 5/2005 | Canterberry et al. | |
| 6,886,858 B2 | 5/2005 | Olson | |
| 6,887,325 B2 | 5/2005 | Canterberry et al. | |
| 6,894,483 B2 | 5/2005 | Pettypiece, Jr. et al. | |
| 6,905,134 B2 | 6/2005 | Saiguchi et al. | |
| 6,908,104 B2 | 6/2005 | Canterberry et al. | |
| 6,923,483 B2 | 8/2005 | Curry et al. | |
| 6,929,283 B2 | 8/2005 | Gioutsos et al. | |
| 6,932,378 B2 | 8/2005 | Thomas | |
| 6,942,244 B2 | 9/2005 | Roychoudhury | |
| 6,951,350 B2 | 10/2005 | Heidorn et al. | |
| 6,951,532 B2 | 10/2005 | Ford | |
| 6,953,204 B2 | 10/2005 | Xu et al. | |
| 6,955,377 B2 | 10/2005 | Cooper et al. | |
| 6,957,828 B2 | 10/2005 | Keeslar et al. | |
| 6,962,363 B2 | 11/2005 | Wang et al. | |
| 6,962,364 B2 | 11/2005 | Ju et al. | |
| 6,974,154 B2 | 12/2005 | Grossert et al. | |
| 6,983,956 B2 | 1/2006 | Canterberry et al. | |
| 6,994,372 B2 | 2/2006 | Ford et al. | |
| 7,007,973 B2 | 3/2006 | Canterberry et al. | |
| 7,021,653 B2 | 4/2006 | Burdock et al. | |
| 7,029,024 B2 | 4/2006 | Baumbach | |
| 7,036,844 B2 | 5/2006 | Hammer et al. | |
| 7,044,500 B2 | 5/2006 | Kalandek et al. | |

| | | | | | | |
|---|---|---|---|---|---|---|
| 7,044,502 | B2 | 5/2006 | Trevillyan et al. | 2005/0248135 A1 | 11/2005 | Poli et al. |
| 7,048,298 | B2 | 5/2006 | Arwood et al. | 2006/0108775 A1 | 5/2006 | Schirholz et al. |
| 7,052,034 | B2 | 5/2006 | Lochmann et al. | 2006/0119084 A1 | 6/2006 | Coon et al. |
| 7,055,856 | B2 | 6/2006 | Ford et al. | 2006/0175816 A1 | 8/2006 | Spencer et al. |
| 7,063,350 | B2 | 6/2006 | Steimke et al. | 2006/0186644 A1 | 8/2006 | Manire et al. |
| 7,070,203 | B2 | 7/2006 | Fisher et al. | 2006/0220360 A1 | 10/2006 | Ridolfi et al. |
| 7,081,692 | B2 | 7/2006 | Pettypiece, Jr. et al. | 2006/0255570 A1 | 11/2006 | Wipasuramonton et al. |
| 7,090,246 | B2 | 8/2006 | Lincoln et al. | 2007/0001435 A1* | 1/2007 | Gray et al. ............. 280/733 |
| 7,107,133 | B2 | 9/2006 | Fisher et al. | 2007/0001437 A1 | 1/2007 | Wall et al. |
| 7,121,581 | B2 | 10/2006 | Xu et al. | 2007/0075534 A1 | 4/2007 | Kelley et al. |
| 7,131,662 | B2 | 11/2006 | Fisher et al. | 2007/0075535 A1 | 4/2007 | Trevillyan et al. |
| 7,131,664 | B1 | 11/2006 | Pang et al. | 2007/0075536 A1 | 4/2007 | Kelley et al. |
| 7,147,245 | B2 | 12/2006 | Florsheimer et al. | 2007/0085309 A1 | 4/2007 | Kelley et al. |
| 7,152,880 | B1 | 12/2006 | Pang et al. | 2007/0108753 A1 | 5/2007 | Pang et al. |
| 7,163,236 | B2* | 1/2007 | Masuda et al. ............. 280/733 | 2007/0138775 A1 | 6/2007 | Rossbach et al. |
| 7,198,285 | B2 | 4/2007 | Hochstein-Lenzen et al. | 2007/0138776 A1 | 6/2007 | Rossbach et al. |
| 7,198,293 | B2 | 4/2007 | Olson | 2007/0152428 A1 | 7/2007 | Poli et al. |
| 7,213,836 | B2 | 5/2007 | Coon et al. | 2007/0182137 A1* | 8/2007 | Hiroshige et al. ........... 280/733 |
| 7,216,891 | B2 | 5/2007 | Biglino et al. | 2007/0200329 A1 | 8/2007 | Ma |
| 7,216,892 | B2 | 5/2007 | Baumbach et al. | 2007/0222189 A1 | 9/2007 | Baumbach et al. |
| 7,222,877 | B2 | 5/2007 | Wipasuramonton et al. | 2007/0241223 A1 | 10/2007 | Boelstler et al. |
| 7,255,364 | B2 | 8/2007 | Bonam et al. | 2008/0018086 A1 | 1/2008 | Ford et al. |
| 7,261,315 | B2 | 8/2007 | Hofmann et al. | 2008/0054602 A1 | 3/2008 | Yang |
| 7,261,316 | B1 | 8/2007 | Salmo et al. | 2008/0084050 A1 | 4/2008 | Volkmann et al. |
| 7,264,269 | B2 | 9/2007 | Gu et al. | 2008/0088118 A1 | 4/2008 | Wipasuramonton et al. |
| 7,267,361 | B2 | 9/2007 | Hofmann et al. | 2008/0106074 A1 | 5/2008 | Ford |
| 7,270,344 | B2 | 9/2007 | Schirholz et al. | 2009/0051150 A1* | 2/2009 | Murakami ................... 280/733 |
| 7,278,656 | B1 | 10/2007 | Kalandek | | | |
| 7,281,733 | B2 | 10/2007 | Pieruch et al. | | | |
| 7,303,206 | B2 | 12/2007 | Kippschull et al. | | | |
| 7,320,479 | B2 | 1/2008 | Trevillyan et al. | | | |
| 7,325,829 | B2 | 2/2008 | Kelley et al. | | | |
| 7,341,276 | B2 | 3/2008 | Kelley et al. | | | |
| 7,347,449 | B2 | 3/2008 | Rossbach et al. | | | |
| 7,350,806 | B2 | 4/2008 | Ridolfi et al. | | | |
| 7,354,064 | B2 | 4/2008 | Block et al. | | | |
| 7,367,590 | B2 | 5/2008 | Koning et al. | | | |
| 7,506,891 | B2* | 3/2009 | Quioc et al. ............. 280/741 | | | |
| 7,513,524 | B2* | 4/2009 | Oota et al. ............. 280/733 | | | |
| 2001/0048215 | A1 | 12/2001 | Breed et al. | | | |
| 2002/0011723 | A1 | 1/2002 | Lewis | | | |
| 2002/0024200 | A1 | 2/2002 | Eckert et al. | | | |
| 2002/0101067 | A1 | 8/2002 | Breed | | | |
| 2002/0125700 | A1 | 9/2002 | Adkisson | | | |
| 2002/0140209 | A1 | 10/2002 | Waid et al. | | | |
| 2003/0168837 | A1* | 9/2003 | Schneider et al. ............ 280/733 | | | |
| 2004/0164532 | A1 | 8/2004 | Heidorn et al. | | | |
| 2004/0178614 | A1 | 9/2004 | Countryman et al. | | | |
| 2004/0188988 | A1 | 9/2004 | Wipasuramonton et al. | | | |
| 2005/0006884 | A1 | 1/2005 | Cooper et al. | | | |
| 2005/0146119 | A1 | 7/2005 | Ford et al. | | | |
| 2005/0212270 | A1 | 9/2005 | Wipasuramonton et al. | | | |
| 2005/0218635 | A1 | 10/2005 | Wipasuramonton et al. | | | |

FOREIGN PATENT DOCUMENTS

| | | |
|---|---|---|
| DE | 4211209 | 10/1993 |
| DE | 19742151 | 4/1998 |
| DE | 10041042 | 5/2001 |
| EP | 0639481 | 2/1995 |
| EP | 0765780 | 4/1997 |
| EP | 1101660 | 5/2001 |
| FR | 2703011 | 9/1994 |
| GB | 2306876 | 5/1997 |
| GB | 2368050 | 4/2002 |
| GB | 2410009 | 7/2005 |
| JP | 63258239 | 10/1988 |
| JP | 1083436 | 3/1989 |
| JP | 11189117 | 7/1999 |
| WO | WO-8807947 | 10/1988 |
| WO | WO-9939940 | 8/1999 |
| WO | WO-9942336 | 8/1999 |
| WO | WO-0100456 | 1/2001 |
| WO | WO-0168413 | 9/2001 |

OTHER PUBLICATIONS

U.S. Appl. No. 12/051,768, filed Mar. 19, 2008, Foubert.

* cited by examiner

INFLATABLE PERSONAL RESTRAINT SYSTEMS AND ASSOCIATED METHODS OF USE AND MANUFACTURE

TECHNICAL FIELD

The following disclosure relates generally to inflatable personal restraint systems for use in vehicles.

BACKGROUND

Airbags can provide protection for occupants in many different types of vehicles during accidents. In cars, for example, airbags can deploy from the steering column, dashboard, side panel, etc., to protect the driver and/or passenger(s). During a sudden deceleration of the car, such as in a collision, the airbag rapidly inflates with gas and deploys toward the driver and/or the passenger.

Although a seat belt will generally restrain a person during an accident, an airbag can provide additional protection. An airbag positioned in the steering column, for example, can expand in front of the driver to cushion his torso and head. The airbag can prevent the driver's head from hitting the steering wheel, and can also reduce whiplash. Airbags can also be deployed to provide protection from side impact collisions.

Although the airbags described above are common in automobiles, other types of vehicles have adopted other types of airbags. These other types of airbags are useful because airbags that deploy from a specific location in an automobile (e.g., from the steering column) may not be useable in other types of vehicles, or for passengers in different locations in a vehicle. To accommodate different vehicles and passenger positions, airbags have been developed that deploy from seat belts. For example, during a sudden deceleration, an airbag can deploy from a lap belt or a shoulder belt to provide additional protection. These seat belt deployable airbags can be adapted for different vehicles.

SUMMARY

The following summary is provided for the benefit of the reader only, and is not intended to limit the disclosure as set forth by the claims in any way.

The present disclosure is directed generally to personal restraint systems for restraining an occupant in a vehicle. A personal restraint system configured in accordance with one aspect of the disclosure includes an airbag that is deployable from a seat belt, web, or other form of personal restraint strap. The web is operably coupled to an interior portion of a vehicle and extends around a portion of an occupant seated in the vehicle (e.g., over the occupant's shoulder). The airbag includes a first inflatable chamber that is in fluid communication with a second inflatable chamber. The first inflatable chamber is attached to the web and has a generally tubular shape that extends adjacent to the web when inflated. The second inflatable chamber extends outwardly from the first inflatable chamber in a generally lateral direction adjacent to a portion of the occupant when the second inflatable chamber is inflated.

A method of restraining an occupant in a vehicle in accordance with another aspect of the disclosure includes detecting a deceleration of the vehicle and deploying an airbag in response to the deceleration. The airbag is carried by a web that is operably coupled to the vehicle, and the airbag includes a first chamber in fluid communication with a second chamber. The first chamber has a first exterior surface portion attached to the web, and a second exterior surface portion attached to a third exterior surface portion of the second chamber.

DETAILED DESCRIPTION

The following disclosure describes various types of inflatable personal restraint systems and methods of making and using such restraint systems. Certain details are set forth in the following description and in FIGS. 1A-8D to provide a thorough understanding of various embodiments of the disclosure. Other details describing well-known structures and systems often associated with restraint systems, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Various embodiments of the disclosure can include structures other than those illustrated in the Figures and are expressly not limited to the structures shown in the Figures.

Figure 1A:
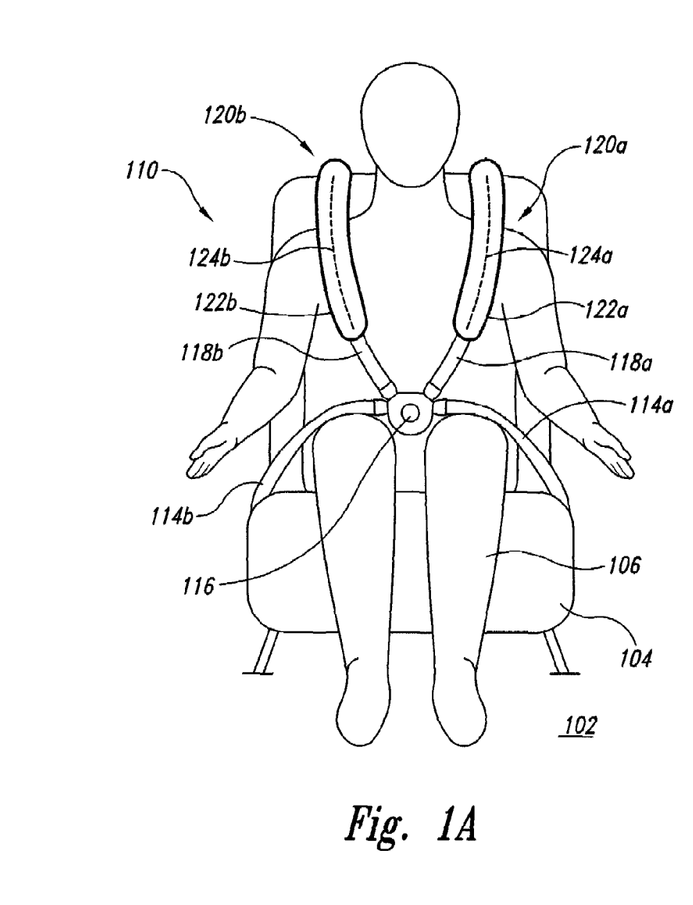
FIGS. 1A-1C are a series of front views of an occupant of a vehicle positioned in a restraint system configured in accordance with an embodiment of the disclosure.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1. Moreover, the various elements and features illustrated in the Figures may not be drawn to scale.

Figure 1B:
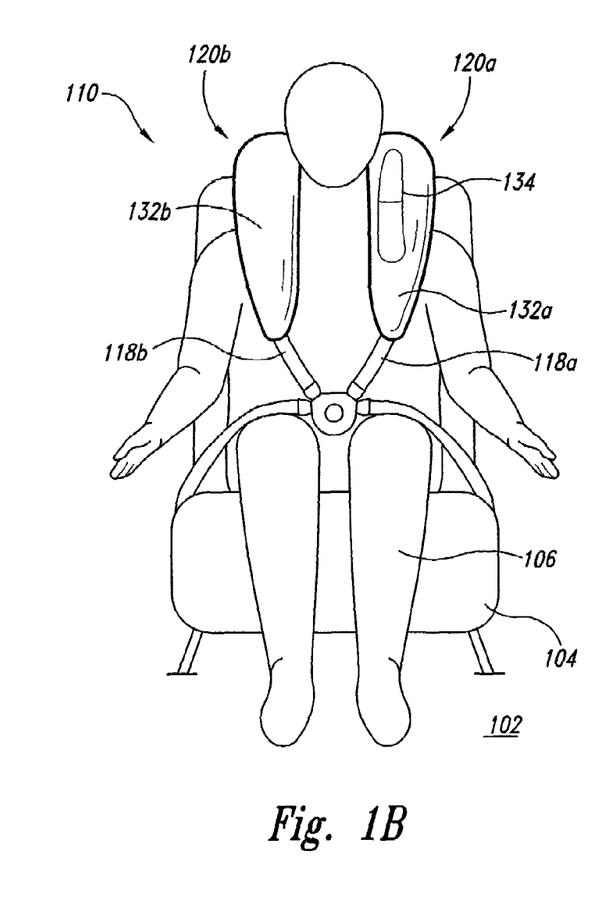
Figure 1C:
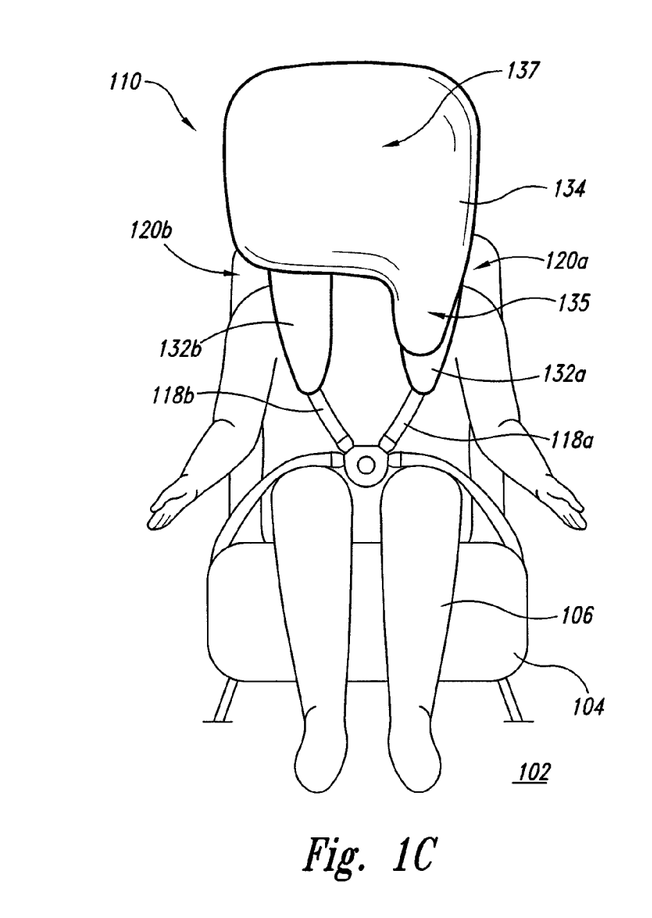
Figure 1D:
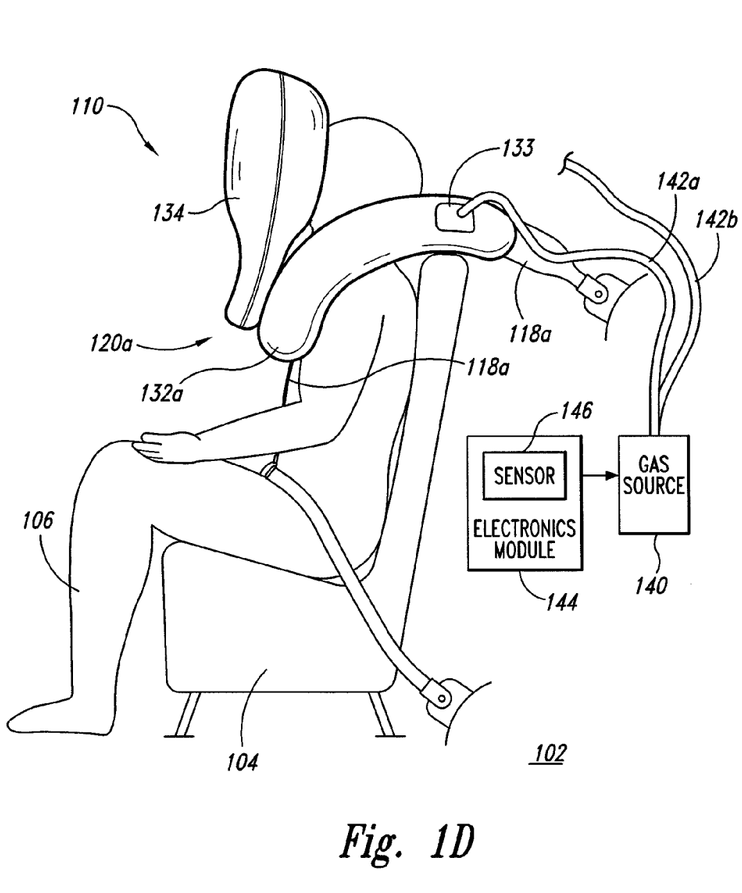
FIG. 1D is a side view of the occupant and restraint system of FIGS. 1A-1C.

FIGS. 1A-1D illustrate a personal restraint system 110 configured in accordance with an embodiment of the disclosure in various stages of deployment. More specifically, FIGS. 1A-1C are a series of front views, and FIG. 1D is a side view, of an occupant 106 secured in a seat 104 by a restraint system 110. The seat 104 is positioned in a vehicle 102. One of ordinary skill in the art will appreciate, however, that the restraint system 110 can be used with any type of vehicle, including, for example, automobiles, military vehicles, aircraft, rotorcraft, watercraft, etc.

Referring first to FIG. 1A, the restraint system 110 can include multiple belts or webs extending over and/or around the occupant 106 and connected to each other with a buckle 116. As used herein, "webs" can be any type of flexible straps or belts, such as seat belts made from a woven material as is known in the art. For example, in the illustrated embodiment the restraint system 110 includes lap webs 114 (identified individually as a first lap web 114a and a second lap web 114b), as well as shoulder webs 118 (identified individually as a first shoulder web 118a and a second shoulder web 118b). Although this embodiment of the restraint system 110 includes two lap webs 114 and two shoulder webs 116, in other embodiments the restraint system 110 can have other web configurations, including for example, a different number of webs, different types of webs, etc. Moreover, the lap webs 114 and shoulder webs 118 can each include features typically associated with conventional webs and safety belts. For example, the lap webs 114 and shoulder webs 118 can each include flexible segments of a fixed length and/or adjustable length to accommodate different sized occupants. The distal ends of the webs can also be operably coupled to the vehicle 102 and/or seat 104 with an inertial reel or other device to automatically adjust the fit of the webs 114, 118 in response to movement of the occupant 106.

In the embodiment illustrated in FIG. 1A, each shoulder web 118 includes an uninflated airbag 120 (identified individually as a first airbag 120a and a second airbag 120b). Each web 118 also includes a cover 122 (identified individually as a first cover 122a and a second cover 122b) to generally enclose and retain the corresponding airbags 120 in their uninflated positions. The airbags 120 can be folded, rolled, stuffed, or otherwise contained within the covers 122, such that the shoulder webs 118 have a generally flat appearance during normal use. Each cover 122 can include a tear seam 124 (identified individually as a first tear seam 124a and a second tear seam 124b), or other type of weakened portion. When the airbags 120 are inflated, the covers 122 come apart at the tear seams 124 to allow the airbags 120 to deploy from the shoulder webs 118. Although not shown in FIG. 1A, the restraint system 110 can also include a gas source 140 (e.g., an inflator) and an electronics module 144 (illustrated in FIG. 1D) for deployment of the airbags 120.

Turning next to FIG. 1B, the airbags 120 are shown as partially deployed during a rapid deceleration event (e.g., a sudden stop, collision, etc. of the vehicle 102). In the illustrated embodiment, each airbag 120 includes a tubular chamber 132 (identified individually as a first tubular chamber 132a and a second tubular chamber 132b) that is at least partially inflated with gas. As described in greater detail below, each tubular chamber 132 is attached directly to the corresponding shoulder web 118 to deploy therefrom. When inflated, each tubular chamber 132 has a generally cylindrical or tubular shape that extends adjacent to the corresponding web 118 in general alignment therewith over the shoulder of the occupant 106. In other embodiments, however, the tubular chambers 132 can have other shapes that are different from those illustrated. Such shapes can include, for example, other symmetrical and/or nonsymmetrical shapes and sizes.

When the tubular chambers 132 are deployed, they put the corresponding webs 118 in tension. For example, as the tubular chambers 132 inflate, their cross-sectional areas increase and their overall lengths decrease. As the length of each tubular chamber 132 decreases, each tubular chamber 132 increases the tension in the corresponding shoulder web 118.

In the illustrated embodiment, the first airbag 120a also includes a barrier chamber 134 that deploys from the first tubular chamber 132a. At the stage illustrated in FIG. 1B, however, the barrier chamber 134 is in a generally uninflated position. Although the barrier chamber 134 is separate from the first tubular chamber 132a, the two chambers are in fluid communication with each other. As used herein, the term "fluid communication" means that gas can flow at least from the first tubular chamber 132a into the barrier chamber 134. As described in more detail below with reference to FIGS. 2A and 2B, the barrier chamber 134 can be sewn or otherwise attached directly to the first tubular chamber 132a.

As the first tubular chamber 132a is inflated with gas, the gas passes through the first tubular chamber 132a and into the barrier chamber 134 to inflate the barrier chamber 134. In this configuration, the barrier chamber 134 inflates and deploys directly from the first tubular chamber 132a after the first tubular chamber 132a is at least partially inflated. Moreover, after the barrier chamber 134 is inflated, the gas in the barrier chamber 134 can vent (during, for example, an impact) into the first tubular chamber 132a, which can in turn vent or exhaust to the environment exterior to the first airbag 120a.

Referring next to FIGS. 1C and 1D together, the airbags 120 are shown in fully deployed positions. The tubular chambers 132, for example, are fully inflated and tensioning the shoulder webs 118. The barrier chamber 134 is also fully inflated and extending outwardly and/or laterally from the first tubular chamber 132 in front of the occupant 106. The shape of the inflated barrier chamber 134 is configured to extend from the first tubular chamber 132a in a generally lateral or horizontal direction in front of the occupant 106, or more specifically, the occupant's head. For example, in the illustrated embodiment, the barrier chamber 134 has a generally inverted "L" shape, including a lower portion 135 attached to the first tubular chamber 132a, and an enlarged upper portion 137 extending in front of the occupant 106. In other embodiments, however, the barrier chamber 134 can have other inflated shapes, and/or be deployed in other directions. For example, in certain embodiments, the barrier chamber 134 can deploy toward the side of the occupant's head, shoulder, legs, etc., or downwardly in front of the occupant's torso.

FIG. 1D illustrates a first gas conduit or tube 142a connecting the gas source 140 (shown schematically) to the first tubular chamber 132a. A second gas tube 142b can similarly connect the gas source 140 to the second tubular chamber 132b. In the illustrated embodiment, the first tubular chamber 132a can include a reinforced portion 133 (e.g., a material doubler) to strengthen the area of the first tubular chamber 132a where the gas tube 142 is attached. Although the gas tube 142 is connected to the first tubular chamber 132a, the connection between the first tubular chamber 132a and the gas tube 142 is not an air tight seal, so that the first tubular chamber 132a can vent from the area where the gas tube 142 is attached after the airbag 120a is deployed. The gas source 140 of the illustrated embodiment can include a compressed gas canister or other type of suitable compressed gas source known in the art for use with vehicular restraint systems.

The gas source 140 is also operably coupled to the electronics module 144. The electronics module 144 includes at least a deceleration sensor 146 (shown schematically) and associated electronics configured to detect a rapid deceleration of the vehicle 102 above a preset magnitude, and transmit a corresponding signal to the gas source 140. The signal causes the gas source 140 to automatically inflate the airbags 120 during the deceleration. One or ordinary skill in the art will appreciate that the gas source 140 and electronics module 144 can be positioned proximate to each other or at different locations in the vehicle 102. In certain embodiments, for example, these components can be positioned in or on the back portion and/or bottom portion of the seat 104. In other embodiments, however, the gas source 140 and electronics module 144 can be positioned elsewhere in the vehicle 102.

In the embodiment illustrated in FIGS. 1A-1D, the restraint system 110 generally restrains the occupant 106 in the seat 104 and at least partially protects the occupant 106 during a sudden impact or other rapid deceleration event. When the restraint system 110 deploys, for example, the airbags 120 provide forward and side protection for both the head and torso of the occupant 106. One advantage of the illustrated embodiment is that as the tubular chambers 132 inflate, they securely position the occupant 106 in the seat 104 by tensioning the shoulder webs 118. In contrast, conventional shoulder webs are not pretensioned before an accident. Another advantage of the illustrated embodiment is that each tubular chamber 132 provides increased surface area of the shoulder web 118 that contacts the upper torso of the occupant 106. The increased surface area of each tubular chamber 132 evenly distributes the force exerted by the shoulder web 118 against the occupant 106 during the deceleration, thus reducing the pressure of the shoulder web 118 against the occupant 106. The tubular chambers 132 also provide lateral cushioning and stabilization for the occupant 106 during rapid deceleration.

A further advantage of the illustrated embodiment is the impact protection provided by the barrier chamber 134 extending from the first tubular chamber 132a. In addition to the restraining benefits of the tubular chambers 132 noted above, the barrier chamber 134 provides forward impact protection that can be specifically positioned for the head and upper torso of the occupant 106. During rapid deceleration, for example, the barrier chamber 134 deploys in front of the occupant's upper body to cushion the head and torso. Moreover, although the barrier chamber 134 of the illustrated embodiment deploys from the first tubular chamber 132a positioned on the occupant's left shoulder, in other embodiments, the barrier chamber 134 can deploy from the second tubular chamber 132b on the occupant's right shoulder. The restraint system 110 can also include multiple barrier chambers that deploy from one or both of the tubular chambers 132.

Figure 2A:
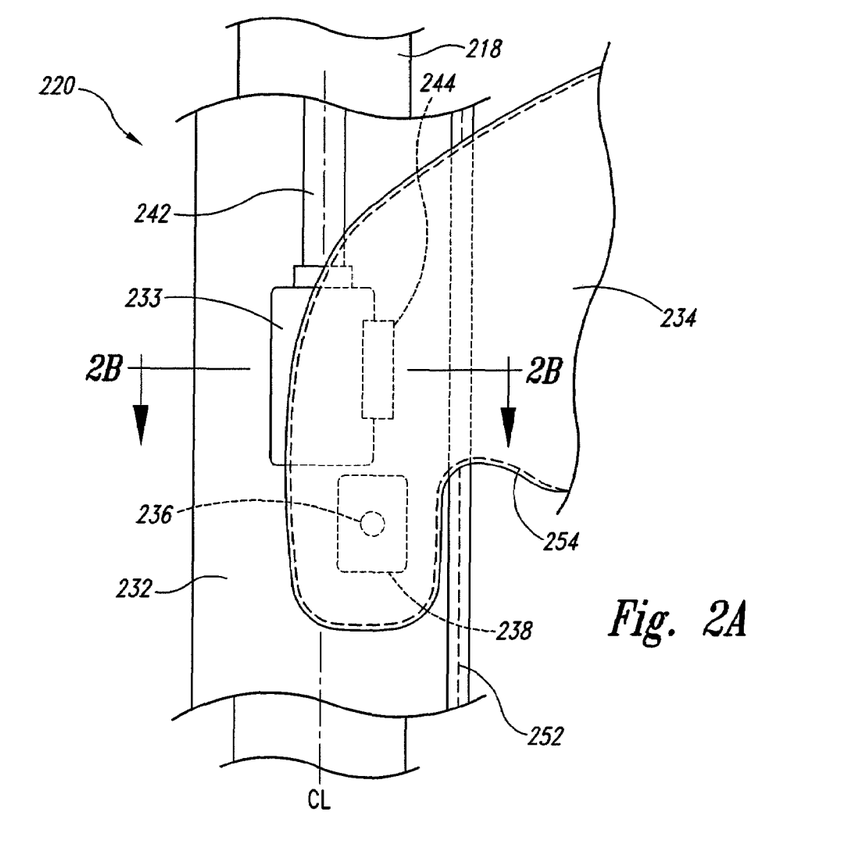
FIG. 2A is a front view of a portion of a personal restraint system configured in accordance with another embodiment of the disclosure.

FIG. 2A is a front view of a portion of an airbag 220 configured in accordance with an embodiment of the disclosure. The airbag 220 is generally similar in structure and function to the first airbag 120a described above with reference to FIGS. 1A-1D. For example, the airbag 220 includes a tubular chamber 232 attached to a web 218, and a barrier chamber 234 attached to, and in fluid communication with, the tubular chamber 232. The airbag 220 also includes a gas tube 242 having an open end portion attached to a reinforced portion 233 (e.g., a material doubler) of the tubular chamber 232. The gas tube 242 can be made from a flexible hose and/or other suitable materials known in the art. In certain embodiments, the gas tube 242 can have an end portion that includes a flap that is sewn or otherwise attached to the reinforced portion 233 of the barrier chamber 232. In addition to attaching the gas tube 242 to the barrier chamber 232, the flap can also create an opening in the gas tube 242 to allow the gas to enter the tubular chamber 232 from the gas tube 242.

As noted above, the attachment between the gas tube 242 and the reinforced portion 233 is not an air tight connection. Accordingly, during and/or following a rapid deceleration event, the gas entering the tubular chamber 232 from the gas tube 242 can vent from the tubular chamber 232 at the attachment area of the gas tube 242. Moreover, as an occupant impacts the inflated barrier chamber 234, gas can also vent from the barrier chamber 234 into the tubular chamber 232, and exit the tubular chamber 232 at the attachment area at the gas tube 242. This type of venting provides the benefit of reducing a rebound effect as an occupant strikes the barrier chamber 234, while still restraining the occupant with the tubular chambers 232. For example, as the occupant's head impacts the barrier chamber 234, the barrier chamber 234 can at least partially vent or deflate to absorb the impact rather than rebound the occupant's head. Since the gas vents from the barrier chamber 234 through the tubular chamber 232 before exiting the airbag 220, the tubular chamber 232 can remain at least partially inflated and tension a corresponding shoulder web to securely restrain an occupant during the deceleration.

In the illustrated embodiment, the airbag 220 also includes an attachment region 238 between the tubular chamber 232 and the barrier chamber 234, to allow direct attachment therebetween. For example, an exterior surface portion of the barrier chamber 234 can be sewn (e.g., with a double needle stitch) or otherwise attached directly to an exterior surface portion of the tubular chamber 232 at the attachment region 238. As described in greater detail below with reference to FIG. 2B, the attachment region 238 can be positioned at a predetermined location on the tubular chamber 232 to control or influence the direction of the deployment of the barrier chamber 234. In the embodiment illustrated in FIG. 2A, for example, the attachment region 238 is off-center and/or spaced apart from an approximate centerline CL of the tubular chamber 232. Attaching the barrier chamber 234 at this location on the tubular chamber 232 orients the barrier chamber 234 to interact with the occupant 106. For example, in the illustrated embodiment, as the barrier chamber 234 inflates from the tubular chamber 232, the barrier chamber 234 is directed toward the right side of the tubular chamber 232 to push against a portion of the occupant (not shown in FIG. 2A).

In other embodiments, however, the barrier chamber 234 can be positioned at different locations on the tubular chamber 232 for deployment in different orientations relative to an occupant. For example, the barrier chamber 234 can be positioned on the tubular chamber 232 to be directed toward different parts of an occupant's body, and/or toward a specific structure of the vehicle. Accordingly, the barrier chamber 234 can be directed toward the head, upper torso, legs, etc. of the occupant. In an embodiment with an occupant positioned sideways in a vehicle, for example, the barrier chamber 234 can be configured to deploy to the side of the occupant to provide side-impact protection. The barrier chamber 234 can also be attached at more than one location on the tubular chamber 232, and can also be in fluid communication with the tubular chamber 232 at more than one location.

To provide the fluid communication between the chambers, the tubular chamber 232 includes a gas transfer passage, such as an aperture or opening 236, within the attachment region 238. The opening 236 can have a diameter that is sized to restrict or otherwise control the flow of gas from the tubular chamber 232 to the barrier chamber 234, and vice versa. Restricting the flow of gas between the chambers allows the tubular chamber 232 to at least partially inflate and tension the attached shoulder web before the barrier chamber 234 inflates. In one embodiment, for example, the opening 236 can have a diameter of about 1.5 inches. In other embodiments, however, the opening 236 can have different sizes depending on various factors such as the size of the chambers, the type of gas source, etc. In addition or alternatively, the tubular chamber 232 can include a plurality of relatively small openings within the attachment region 238. For example, the tubular chamber 232 can have a screen or mesh-type material at the attachment region 238. Moreover, the airbag 220 can also include other types of flow restrictors, such as a valve, positioned between the chambers to control the gas flow therebetween. Additionally, in other embodiments, the tubular chamber 232 and the barrier chamber 234 can also be configured to inflate simultaneously, or the tubular chamber 232 can inflate after the barrier chamber 234 inflates or is otherwise at least partially deployed. For example, the gas tube 242 can be attached to the barrier chamber 234, rather than the tubular chamber 232, to inflate the barrier chamber 234 first.

Figure 2B:
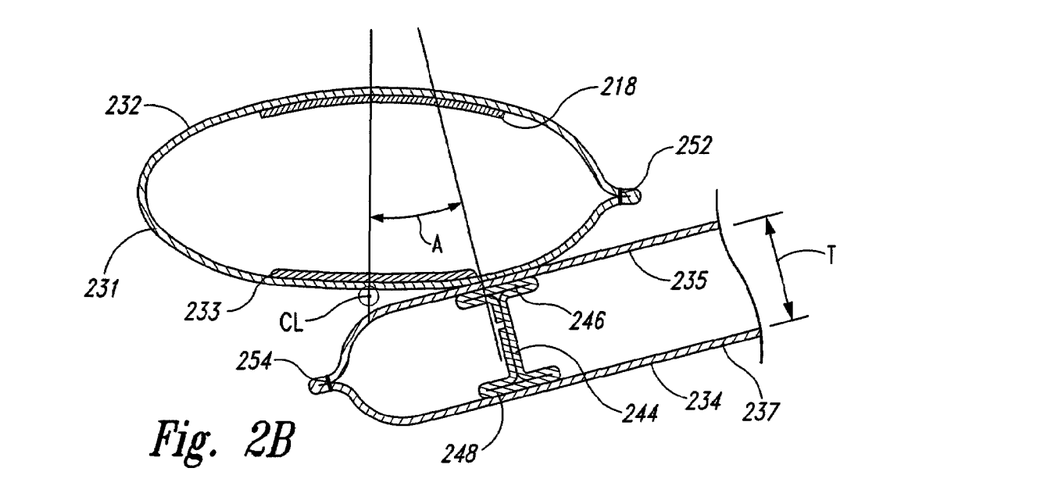
FIG. 2B is an enlarged cross-sectional top view taken along line 2B-2B of FIG. 2A of the restraint system.

FIG. 2B is an enlarged cross-sectional top view taken along line 2B-2B of FIG. 2A showing a portion of the airbag 220. As illustrated in FIG. 2B, in this embodiment the barrier chamber 234 and the tubular chamber 232 are formed as separate chambers. For example, the tubular chamber 232 can be formed from a single piece of material 231 (e.g., a silicone coated nylon material) that is sewn or otherwise joined to itself along an edge seam 252. The barrier chamber 234 can similarly be formed from a single piece of material 237 that is folded and sewn or otherwise attached to itself along an edge seam 254. In other embodiments, however, the tubular chamber 232 and the barrier chamber 234 can be formed as part of a single chamber made from a single piece of material.

In the embodiment illustrated in FIG. 2B, the attachment region 238 is laterally offset toward the right side of FIG. 2A for the purpose of directing and rotating the deployed barrier chamber 234 toward the right side of FIG. 2B (e.g., toward the occupant). In certain embodiments, the attachment region 238 can be rotationally offset by an angle A from the centerline CL at the exterior surface of the tubular chamber 232 toward an occupant (e.g., toward the right side of FIG. 2A). In one embodiment, for example, the angle A can be in the range of about 20-50 degrees.

The embodiment illustrated in FIG. 2B can also include one or more optional tethers 244 positioned inside the barrier chamber 234. The tether 244 includes a first end portion 246 attached (e.g., sewn or otherwise fixedly attached) to an interior surface 235 of the barrier chamber 234, and a second end portion 248 attached to the interior surface 235 generally opposite the first end 246 portion. The tether 244 can be made from the same material as the barrier chamber 234 such that it is flexible and can fold with the barrier chamber when uninflated. When inflated as illustrated in FIG. 2B, the tether 244 has a generally I-beam shape that limits the overall thickness T of the barrier chamber 234 at the location of the tether 244. For example, the tether 244 can control the thickness T of the barrier chamber 234 so that it is greatest directly in front of the occupant to cushion the occupant. Referring back to FIG. 1D, for example, the lower portion 135 of the barrier chamber 134 has a reduced thickness compared to the upper portion 137 of the barrier chamber 134 that is configured to cushion the occupant's 106 head. In other embodiments, one or more tethers can be used at different locations within the barrier chamber 234 and/or the tubular chamber 232 to control and contour the overall shape of the airbag 220.

FIGS. 3-7 are a series of front views of the occupant 106 positioned in various restraint systems configured in accordance with other embodiments of the disclosure. In the embodiments illustrated in FIGS. 3-7, the restraint systems include several features that are at least generally similar in structure and function to those of the restraint systems described in detail above with reference to FIGS. 1-2B. For example, the restraint systems illustrated in FIGS. 3-7 include airbags having a tubular chamber attached to a corresponding web, and a barrier chamber that deploys from and is filled by the tubular chamber. As described in more detail below, however, these embodiments include airbags that are inflated proximate to other portions of the occupant 106.

Figure 3:
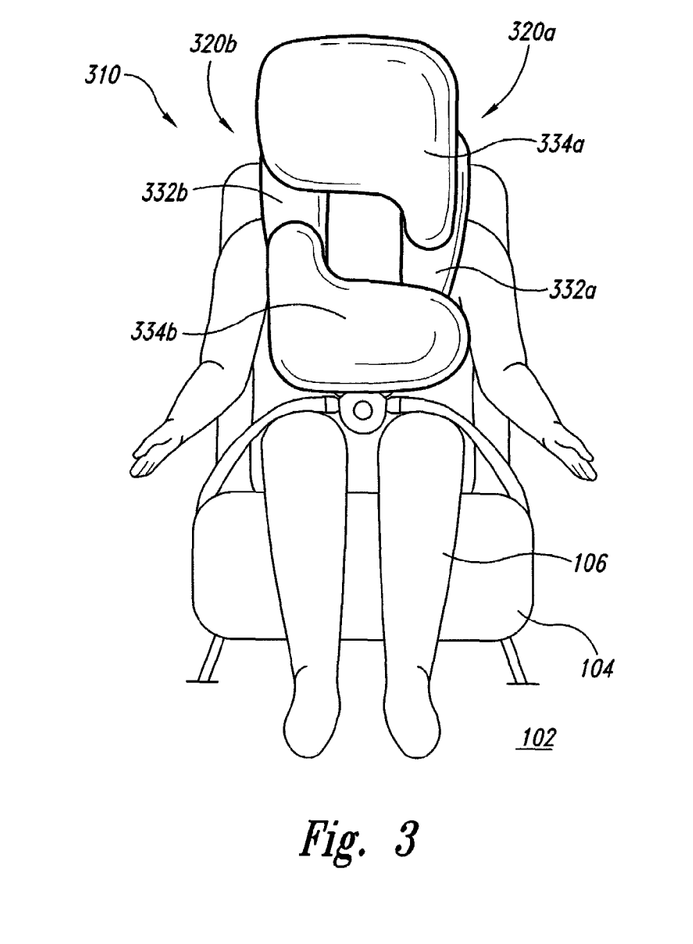
FIGS. 3-7 are a series of front views of an occupant of a vehicle positioned in various restraint systems configured in accordance with other embodiments of the disclosure.

In the embodiment illustrated in FIG. 3, a restraint system 310 includes airbags 320 (identified individually as a first airbag 320a and a second airbag 320b) independently deployed from the corresponding shoulder webs 118 (FIGS. 1A-1D) toward different portions of the occupant's 106 body. The first airbag 320a includes a first tubular chamber 332a extending adjacent to a portion of the first shoulder web 118a. A first barrier chamber 334a deploys from the first tubular chamber 332a and is directed toward the occupant's 106 head. The second airbag 320b includes a second tubular chamber 332b extending adjacent to a portion of the second shoulder web 118b. A second barrier chamber 334b deploys from the second tubular chamber and is directed toward the occupant's 106 abdomen. In the illustrated embodiment, the tubular chambers 332 secure the occupant 106 in the seat 104 while the barrier chambers 334 generally provide front impact protection for the occupant's 106 upper body. As shown in FIG. 3, the second barrier chamber 334b has an "L" shape that is generally similar, although inverted, to that of the first barrier chamber 334a. As described in detail below, however, in other embodiments barrier chambers configured in accordance with the present disclosure can have different shapes and/or extend in other directions.

Figure 4:
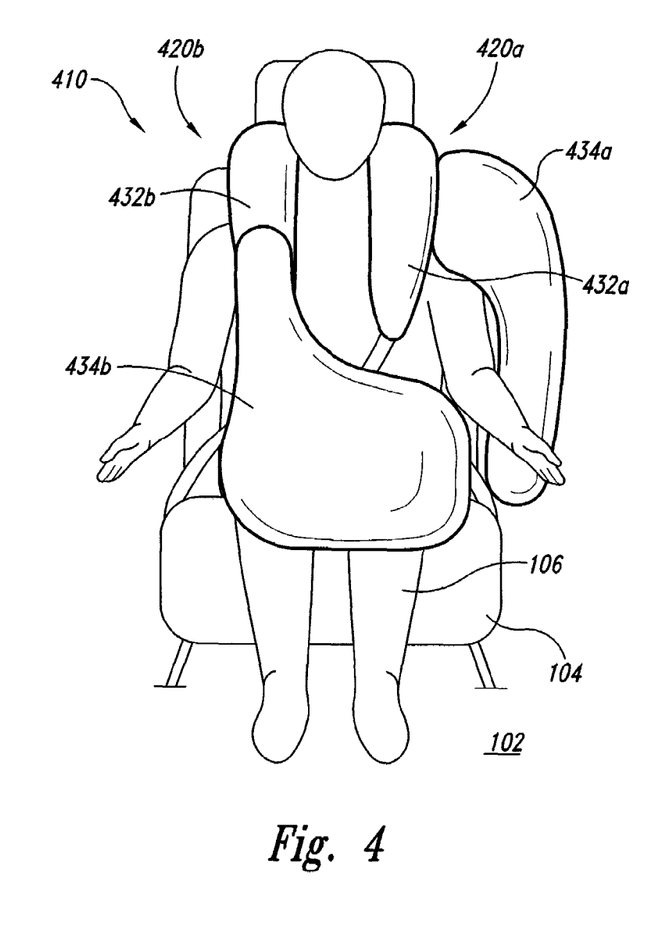

In the embodiment illustrated in FIG. 4, a restraint system 410 includes airbags 420 (identified individually as a first airbag 420a and a second airbag 420b) independently deployed from the corresponding shoulder webs 118 (FIGS. 1A-1D). The first airbag 420a includes a first tubular chamber 432a extending adjacent to a portion of the first shoulder web 118a. A first barrier chamber 434a deploys from the first tubular chamber 432a and is directed generally downward toward the occupant's 106 side. In the illustrated embodiment, the first barrier chamber 434a has an elongated shape to extend from the shoulder to at least the hip of the occupant 106. The second airbag 420b includes a second tubular chamber 432b that extends adjacent to a portion of the second shoulder web 118b. A second barrier chamber 434b deploys from the second tubular chamber 432b and is directed generally toward the occupant's 106 legs. The second barrier chamber 434b extends in front of the knees and lower legs of the occupant 106. The embodiment illustrated in FIG. 4 can simultaneously provide front and side impact protection to the occupant 106.

Figure 5:
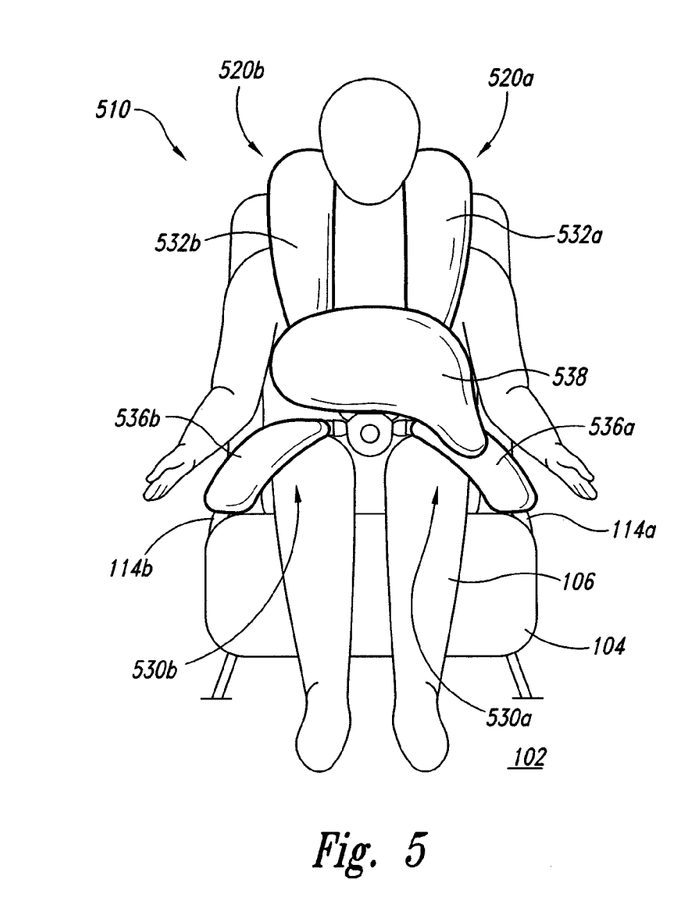

FIG. 5 illustrates a restraint system 510 having upper airbags 520 (identified individually as a first upper airbag 520a and a second upper airbag 520b) independently deployed from the corresponding shoulder webs 118, and lower airbags 530 (identified individually as a first lower airbag 530a and a second lower airbag 530b) independently deployed from the corresponding lap webs 114 (FIGS. 1A-1D). The first upper airbag 520a includes a first tubular chamber 532a extending adjacent to a portion of the first shoulder web 118a, and the second upper airbag 520b includes a second tubular chamber 532b extending adjacent to a portion of the second shoulder web 118b (FIGS. 1A-1D). The first lower airbag 530a includes a third tubular chamber 536a extending adjacent to a portion of the first lap belt 114a. A barrier chamber 538 deploys from the third tubular chamber 536a toward the occupant's 106 abdomen. The second lower airbag 530b includes a fourth tubular chamber 536b extending adjacent to a portion of the second lap belt 114b. In the embodiment illustrated in FIG. 5, the barrier chamber 538 provides forward protection to the occupant's 106 abdomen, while the tubular chambers of the upper airbags 520 and the lower airbags 530 secure the occupant 106 in the seat 104.

Figure 6:
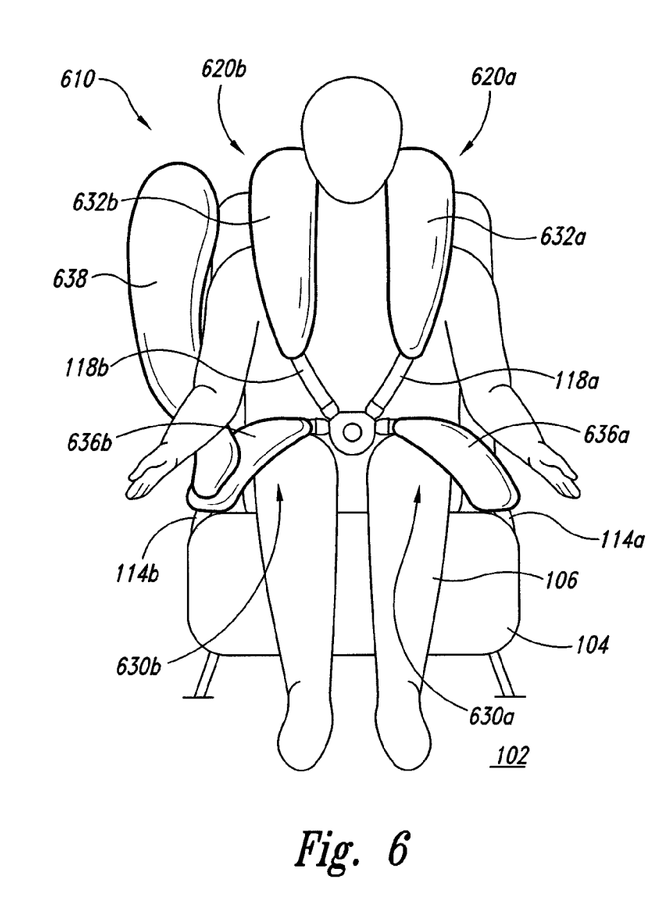

Referring next to FIG. 6, a restraint system 610 includes upper airbags 620 (identified individually as a first upper airbag 620a and a second upper airbag 620b) independently deployed from the corresponding shoulder webs 118, and lower airbags 630 (identified individually as a first lower airbag 630a and a second lower airbag 630b) independently deployed from the corresponding lap webs 114. The first upper airbag 620a includes a first tubular chamber 632a extending adjacent to a portion of the first shoulder web 118a, and the second upper airbag 630b includes a second tubular chamber 632b extending adjacent to a portion of the second shoulder web 118b. The first lower airbag 630a includes a third tubular chamber 636a extending adjacent to a portion of the first lap web 114a, and the second lower airbag 630b includes a fourth tubular chamber 636b extending adjacent to a portion of the second lap web 114b. A barrier chamber 638 deploys from the fourth tubular chamber 636b toward the upper side portion of the occupant 106. In the embodiment illustrated in FIG. 6, the barrier chamber 638 has an elongated shape that extends generally from the occupant's 106 hip to the occupant's 106 shoulder and/or head.

Figure 7:
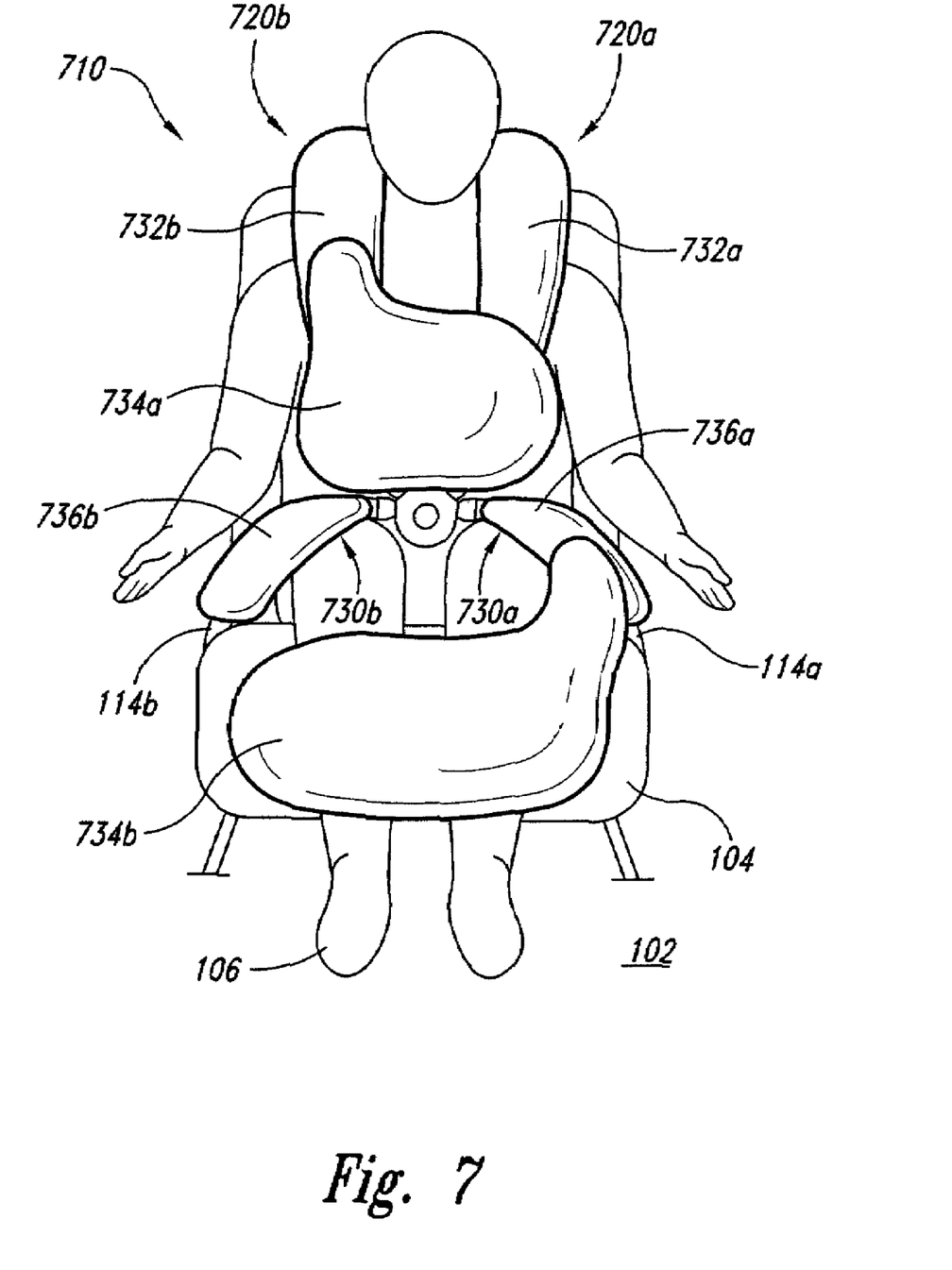

FIG. 7 illustrates a restraint system 710 having upper airbags 720 (identified individually as a first upper airbag 720a and a second upper airbag 720b) independently deployed from the corresponding shoulder webs 118, and lower airbags 730 (identified individually as a first lower airbag 730a and a second lower airbag 730b) independently deployed from the corresponding lap webs 114 (FIGS. 1A-1D). The first upper airbag 720a includes a first tubular chamber 732a extending adjacent to a portion of the first shoulder web 118a, and the second upper airbag 730b includes a second tubular chamber 732b extending adjacent to a portion of the second shoulder web 118b. A first barrier chamber 734a deploys from the second tubular chamber 732b toward the occupant's 106 abdomen. The first lower airbag 730a includes a third tubular chamber 736a extending adjacent to a portion of the first lap web 114a, and the second lower airbag 730b includes a fourth tubular chamber 736b extending adjacent to a portion of the second lap web 114b. A second barrier chamber 734b deploys from the third tubular chamber 736a toward the lower portions of the occupant's 106 legs.

Although FIGS. 3-7 illustrate various restraint systems configured in accordance with different embodiments of the disclosure, one of ordinary skill in the art will appreciate that the present disclosure is not limited to the illustrated embodiments. For example, in other embodiments, restraint systems configured in accordance with the present disclosure can include airbags having barrier chambers with different shapes, barrier chambers deployed in other directions, multiple barrier chambers deployed from a single tubular chamber, etc.

FIGS. 8A-8D are a series of front views illustrating several steps in a method of folding an airbag 820 in accordance with an embodiment of the disclosure. The airbag 820 includes several features that are at least generally similar in structure and function to those of the airbags discussed above with reference to FIGS. 1A-7. For example, the airbag 820 includes a barrier chamber 834 and a tubular chamber (not shown) beneath the barrier chamber 834 and attached to a shoulder web 816. The shoulder web 816 is attached to a buckle 814, and a gas tube 842 is attached to the tubular chamber. For the purposes of illustrating the folding steps of FIGS. 8B-8D, the barrier chamber 834 includes an upper portion 836, a lower portion 838, a right side portion 844, and a left side portion 846. At the stage illustrated in FIG. 8A, the barrier chamber 834 is uninflated.

Figure 8A:
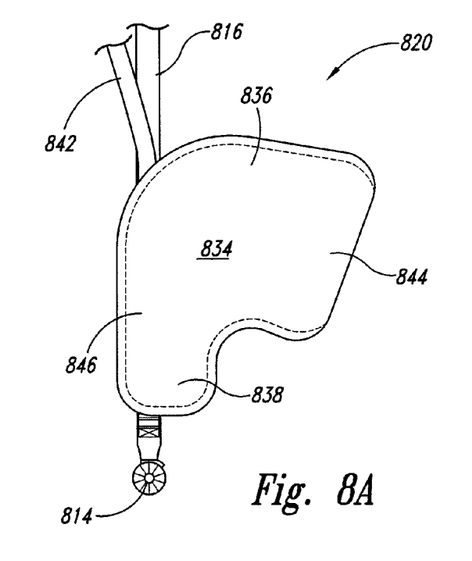
FIGS. 8A-8D are a series of front views illustrating various stages of folding a restraint system in accordance with an embodiment of the disclosure.
Figure 8B:
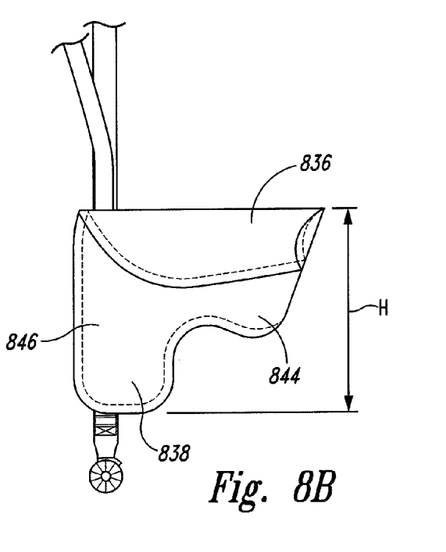
Figure 8C:
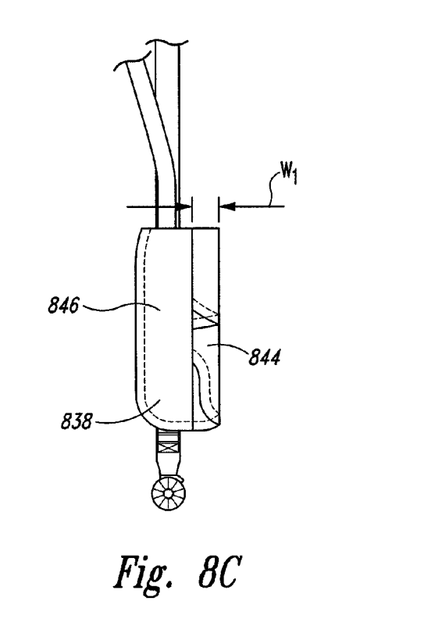

In FIG. 8B, the upper portion 836 is folded toward the lower portion 838 so that the folded barrier chamber 834 has a folded height H. In one embodiment, the folded height H can be about 17 inches. In other embodiments, however, the folded height H can be greater than or less than 17 inches, depending on various factors such as the size of airbag 820, width of the web 816, etc. In FIG. 8C, the right side portion 844 is folded toward the left side portion 846 in a series of zigzag or accordion-type folds each having a folded first width $W_1$. In one embodiment, the folded first width $W_1$ of each zigzag fold can be about two inches, so that the right side portion 844 is folded approximately seven times in the zigzag pattern. In other embodiments, however, the folded first width $W_1$ of each zigzag fold can be greater than or less than two inches, and the right side portion 844 can be folded greater than or less than seven times. The values of the folded height H and first width $W_1$ allow the barrier chamber 834 to be folded in a relatively small package while still allowing proper deployment of the barrier chamber 834.

Figure 8D:
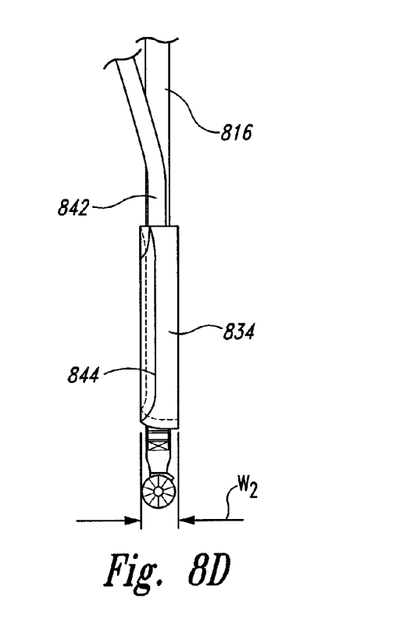

Referring next to FIG. 8D, the zigzag folded right side portion 844 is folded toward the left side portion 846 to position the folded portion of the barrier chamber 834 on top of the tubular chamber and the gas tube 842. The left side portion 846 is then folded toward right side of FIG. 8D over the folded barrier chamber 834, so that the folded barrier chamber has a second width $W_2$. In one embodiment, the second width can be about two inches. In other embodiments, however, the second width $W_2$ can be greater than or less than two inches. A cover (not shown) can also be releasably positioned over the folded barrier chamber 834 and the tubular chamber, as well as portions of the shoulder web 816 and gas tube 842, as illustrated in FIG. 1A. Folding the barrier chamber 834 according to the illustrated steps provides several advantages. In the folded position, for example, the airbag 820 has approximately the same width as the shoulder web 816, thereby providing a comfortable fit for an occupant when the airbag 820 is uninflated. In addition, the barrier chamber 834 is properly positioned over the tubular chamber and the gas tube 842 to correctly deploy and inflate from the tubular chamber.

Those of ordinary skill in the art will appreciate that the folding steps described above with reference to FIGS. 8A-8D are but one embodiment, and various other folding techniques having various modifications and/or variations can be used without departing from the spirit or scope of the present disclosure. For example, the barrier chamber 834 can be folded according to the zigzag folding steps illustrated in FIG. 8C before the reduced height folding step illustrated in FIG. 8B.

From the foregoing, it will be appreciated that specific embodiments of the disclosure have been described herein for purposes of illustration, but that various modifications may be made without deviating from the spirit and scope of the various embodiments of the disclosure. For example, the restraint systems can include multiple barrier chambers that deploy in different directions to protect one or more occupants. Moreover, the restraint systems can also deploy from webs other than the illustrated shoulder and lap webs, including, for example, crotch webs. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A personal restraint system for use with an occupant seated in a vehicle, the personal restraint system comprising:
    a web configured to extend around a portion of the occupant when the occupant is seated in the vehicle; and
    an airbag that includes:

a first inflatable chamber attached to the web, the first inflatable chamber having a generally tubular shape extending adjacent to a portion of the web when inflated; and a second inflatable chamber in fluid communication with the first inflatable chamber, the second inflatable chamber extending outwardly from the first inflatable chamber adjacent to a portion of the occupant when inflated, wherein the second inflatable chamber has an inverted "L" shape when inflated.

2. The personal restraint system of claim 1 wherein the first inflatable chamber has a first exterior surface portion attached to the web and a second exterior surface portion facing away from the web when the first inflatable chamber is inflated, and wherein the second inflatable chamber has a third exterior surface portion attached to the second exterior surface portion of the first inflatable chamber.

3. The personal restraint system of claim 2 wherein the first inflatable chamber is oriented along a centerline when inflated, and wherein third exterior surface portion of the second inflatable chamber is attached to the second exterior surface portion of the first inflatable chamber at a location that is offset from the centerline of the first inflatable chamber.

4. The personal restraint system of claim 1, further comprising:
a gas source;
a conduit operably coupling the gas source to the first inflatable chamber; and
a sensor operably coupled to the gas source, wherein the sensor is configured to
transmit a signal to the gas source in response to a rapid deceleration of the vehicle above a preset magnitude, and wherein the gas source is configured to dispense gas into the first inflatable chamber in response to the signal.

5. The personal restraint system of claim 1 wherein the first inflatable chamber tensions the web when inflated.

6. The personal restraint system of claim 1 wherein the second inflatable chamber inflates in front of the occupant when inflated.

7. The personal restraint system of claim 1 wherein the first inflatable chamber is at least partially inflated before the second inflatable chamber is inflated.

8. The personal restraint system of claim 7, further comprising a gas source operably coupled to the first inflatable chamber, wherein the gas source dispenses gas into the first inflatable chamber to inflate the first inflatable chamber, and wherein the gas flows through an opening in the first inflatable chamber into the second inflatable chamber to inflate the second inflatable chamber.

9. The personal restraint system of claim 7 wherein the gas flows from the second inflatable chamber into the first inflatable chamber when the second inflatable chamber is deflated.

10. The personal restraint system of claim 1:
wherein the web is a shoulder web; and
wherein the second inflatable chamber forms an impact barrier chamber extending from the first inflatable chamber in a generally lateral direction in front of an upper portion of the occupant when inflated.

11. The personal restraint system of claim 1 wherein the web is a first web and the airbag is a first airbag, and wherein the personal restraint system further comprises:
a second web configured to extend around a portion of the occupant when the occupant is seated in the vehicle;
a second airbag carried by the second web, wherein the second airbag includes:

a third inflatable chamber attached to the second web, the third inflatable chamber having a generally tubular shape extending adjacent to a portion of the second web when inflated; and
a fourth inflatable chamber in fluid communication with the third inflatable chamber, the fourth inflatable chamber extending outwardly from the third inflatable chamber adjacent to a portion of the occupant when inflated.

12. A personal restraint system for use in a vehicle, the personal restraint system comprising:
a web operably coupled to the vehicle;
an airbag having a tensioning chamber in fluid communication with an impact barrier chamber, wherein the tensioning chamber is attached to the web and the impact barrier chamber is attached to the tensioning chamber, and wherein the tensioning chamber has a generally tubular shape that tensions the web when inflated, and wherein the impact barrier chamber has a generally inverted "L" shape when inflated that forms a deformable impact cushion for an occupant of the vehicle;
an inflator operably coupled to the tensioning chamber; and
a sensor operably coupled to the inflator, wherein the sensor is configured to activate the inflator in response to a rapid deceleration of the vehicle, whereby the inflator inflates the tensioning chamber and the impact barrier chamber.

13. The personal restraint system of claim 12 wherein the tensioning chamber has a first exterior surface portion attached to the web and a second exterior surface portion attached to a third exterior surface portion of the impact barrier.

14. The personal restraint system of claim 12 wherein the web is a shoulder web and the tensioning chamber has a generally tubular shape extending adjacent to the shoulder web when inflated, and wherein the impact barrier chamber extends outwardly from the tensioning chamber in a lateral direction when inflated.

15. The personal restraint system of claim 12, further comprising a gas transfer passage between the tensioning chamber and the impact barrier chamber, wherein the tensioning chamber receives gas from the inflator, and the impact barrier chamber receives gas from the tensioning chamber.

16. The personal restraint system of claim 15 wherein the impact barrier chamber vents into the tensioning chamber through an opening in the tensioning chamber when the impact barrier deflates.

17. The personal restraint system of claim 12 wherein the web is a first web, the airbag is a first airbag, and the tensioning chamber is a first tensioning chamber, and wherein the restraint system further includes a second web operably coupled to the vehicle and a second airbag having a second tensioning chamber attached to the second web.

18. The personal restraint system of claim 17 wherein the impact barrier chamber is a first impact barrier chamber, the first web is a shoulder web and the second web is a lap web, and wherein the personal restraint system further comprises a second impact barrier chamber attached to the second tensioning chamber, wherein the first impact barrier chamber extends toward a first portion of the occupant and the second impact barrier chamber extends toward a second portion of the occupant.

19. A personal restraint system for use with an occupant in a vehicle, the personal restraint system comprising:

strap means for restraining the occupant in the vehicle, wherein the strap means extend at least partially around a portion of the occupant;

an airbag carried by the strap means, wherein the airbag includes a first chamber in fluid communication with a second chamber, the first chamber having a first surface portion attached to the strap means and a second surface portion attached to the second chamber, wherein the second chamber has a third surface portion that extends laterally from the first chamber when the first and second chambers are inflated, and wherein the second chamber has an inverted "L" shape when inflated; and means for automatically inflating the first and second chambers of the airbag in response to a rapid deceleration of the vehicle.

20. The personal restraint system of claim 19 wherein the first chamber has a generally tubular shape that tensions the strap means when inflated, and wherein the second chamber extends laterally outward in front of the occupant when inflated.

21. The personal restraint system of claim 19 wherein the first chamber is inflated with gas flowing directly from the inflating means, and wherein the second chamber is inflated with the gas flowing indirectly from the inflating means through the first chamber into the second chamber.

22. The personal restraint system of claim 19 wherein the first and second chambers are inflated with gas from the inflating means, and wherein the second chamber vents into the first chamber when the second chamber deflates.

23. A method of restraining an occupant in a vehicle, the method comprising:

detecting a rapid deceleration of the vehicle;

inflating a first chamber of an airbag in response to detecting the deceleration, wherein the first chamber has a generally tubular shape extending adjacent to a web when inflated; and inflating a second chamber of the airbag from the first chamber after the first chamber is at least partially inflated, wherein the second chamber extends outwardly from the first chamber adjacent to a portion of the occupant, and wherein the second chamber has a generally inverted "L" shape when inflated.

24. The method of claim 23 wherein inflating the first chamber of the airbag further includes tensioning the web with the first chamber when the first chamber is inflated.

25. The method of claim 23, further comprising venting the second chamber into the first chamber in response to an impact from the occupant against the second chamber.

26. The method of claim 23 wherein the airbag is a first airbag and the web is a first web, and wherein the method further comprises:

inflating a third chamber of a second airbag in response to detecting the deceleration, wherein the third chamber has a generally tubular shape extending adjacent to a second web when inflated; and inflating a fourth chamber of the second airbag from the third chamber after the third chamber is at least partially inflated, wherein the fourth chamber extends outwardly from the third chamber adjacent to a portion of the occupant.

* * * * *